United States Patent
Eriksson

[11] Patent Number: 6,164,223
[45] Date of Patent: Dec. 26, 2000

[54] METHOD AND DEVICE FOR PLANTING PLANTS

[76] Inventor: Roy Erik Eriksson, Holbergsveien 3, N-1412, Sofiemyr, Norway

[21] Appl. No.: 09/355,375
[22] PCT Filed: Jan. 21, 1998
[86] PCT No.: PCT/NO98/00018
    § 371 Date: Oct. 6, 1999
    § 102(e) Date: Oct. 6, 1999
[87] PCT Pub. No.: WO98/31209
    PCT Pub. Date: Jul. 23, 1998

[30] Foreign Application Priority Data

Jan. 22, 1997 [SE] Sweden .................................. 9700175

[51] Int. Cl.$^7$ .............................. A01B 79/02; A01C 11/00
[52] U.S. Cl. ............................... 111/200; 111/900; 701/50
[58] Field of Search .............................. 111/200, 15, 900, 111/903, 170; 701/50

[56] References Cited

U.S. PATENT DOCUMENTS

| | | |
|---|---|---|
| 4,031,963 | 6/1977 | Poggemiller et al. ............... 111/200 X |
| 4,266,878 | 5/1981 | Auer ..................... 111/200 X |
| 5,033,397 | 7/1991 | Colburn, Jr. ......................... 111/200 X |
| 5,044,756 | 9/1991 | Gaultney et al. .................... 111/200 X |
| 5,220,876 | 6/1993 | Monson et al. ...................... 111/200 X |
| 5,355,815 | 10/1994 | Monson ................... 111/200 |
| 5,524,560 | 6/1996 | Carter ....................... 111/200 |
| 5,598,794 | 2/1997 | Harms et al. ........................ 111/200 X |
| 5,646,846 | 7/1997 | Bruce et al. ........................ 111/200 X |
| 5,673,637 | 10/1997 | Colburn, Jr. et al. .............. 111/200 X |
| 5,709,271 | 1/1998 | Bassett ................................ 111/200 X |

*Primary Examiner*—Christopher J. Novosad
*Attorney, Agent, or Firm*—Fasth Law Offices; Rolf Fasth

[57] ABSTRACT

When planting plants and similar objects a forest vehicle (1) is used which is provided with automatic planting assemblies (13) mounted at hydraulically controlled arms (11). The vehicle (1) moves slowly forwards and the absolute geographic position thereof is determined by means of satellite signals received on the antenna (15). At the frontmost portion of the vehicle (1), on a movable arm (3) scanning device such as a georadar screen (5) is provided, which transmits radar waves having a suitable wavelength and scans the ground area in front of the vehicle (1). The georadar determines the depth of soil and obstacles to planting such as stones and stumps. From the determinations of the georadar also suitable planting places are determined and the positions thereof are stored. The planting arms (11) and their assemblies (13) are then controlled, so that during the continuous movement of the vehicle forwards the planting assemblies stand still at the determined planting places and there perform planting. Owing to the determination of the soil conditions planting can be made with a high yield and due to the automatised procedure using a minimum of man power.

6 Claims, 3 Drawing Sheets

METHOD AND DEVICE FOR PLANTING PLANTS

TECHNICAL FIELD

The present invention relates to an automatic planting machine for planting seeds, plants and similar objects, in particular intended for planting forests.

BACKGROUND OF THE INVENTION AND STATE OF THE ART

When planting forests many plants are set in positions in which they have no possibility to survive. It frequently occurs that the depth of the soil is too small what results in that the plant fades away. Furthermore the distance between planted plants can vary disadvantageously so that the available ground surface is not fully used. A planting operation which is unsuitable in various aspects can also result in that the quality of the wood of the grown-up trees will not be as good as it could else have been.

The cost of reforesting is very high. Manual planting saplings of coniferous trees costs for example about 4 crowns per plant including the cost of purchasing the sapling. The cost of manual planting broad-leaf trees is generally still higher and particularly high is the cost of planting high-grade broad-leaf trees. In many countries there is no time to make plantings in the rate which would be desirable from an ecological and economic aspect since there are no resources for setting aside sufficiently many persons during the planting season. Here in particular USA and Canada can be mentioned. However, the largest problems exist in the developing countries, in which among other things tropical rain forests are sawn and no planned planting of new trees exist. Also in Sweden problems exist of having time for attendance of forests, which is costly owing to the high cost of hired persons.

Thus there is a need for automatic or mechanized planting procedures which should naturally be designed for a rapid and optimized planting, which removes the disadvantages mentioned above and which can result in a planting of plants at optimal positions in the intended ground area.

The commercially available planting machine "Silva Nova" from Storebro Bruk AB is, with a crew of two men, capable of planting up to 1500 plants per hour for good soil conditions. The cost per planted plant comprises approximately the same amount as in manual planting. The machine is in principle a forest vehicle, which has been provided with scarifying wheels having horizontal shafts, which each one is located straight ahead of the tractor wheels in the rear boggy and which turns up a piece of turf under the rear boggy wheels. Behind the same wheels the very planting assemblies are located, one behind each row of rear wheels, which set plants on exactly these positions which have previously been prepared as to the condition of the topsoil.

DESCRIPTION OF THE INVENTION

It is an object of the invention to provide a method and a machine for automatic planting, which allow planting with a high yield.

It is obtained by automatically scanning the area to be planted by means of a remote sensing device, which measures the nature of the ground and in particular the depth thereof and possible obstacles. The ground area is in this way mapped and then optimal planting places are calculated. At these planting places then plants, seeds, and similar objects are planted. The whole procedure is advantageously made continuously when a vehicle equipped with the remote sensing sensor and with planting arms slowly moves forwards over the ground area.

DESCRIPTION OF THE DRAWINGS

The inventions will now be described in greater detail with reference to the accompanying drawings in which.

DESCRIPTION OF THE PREFERRED EMBODIMENT

Figure 1:
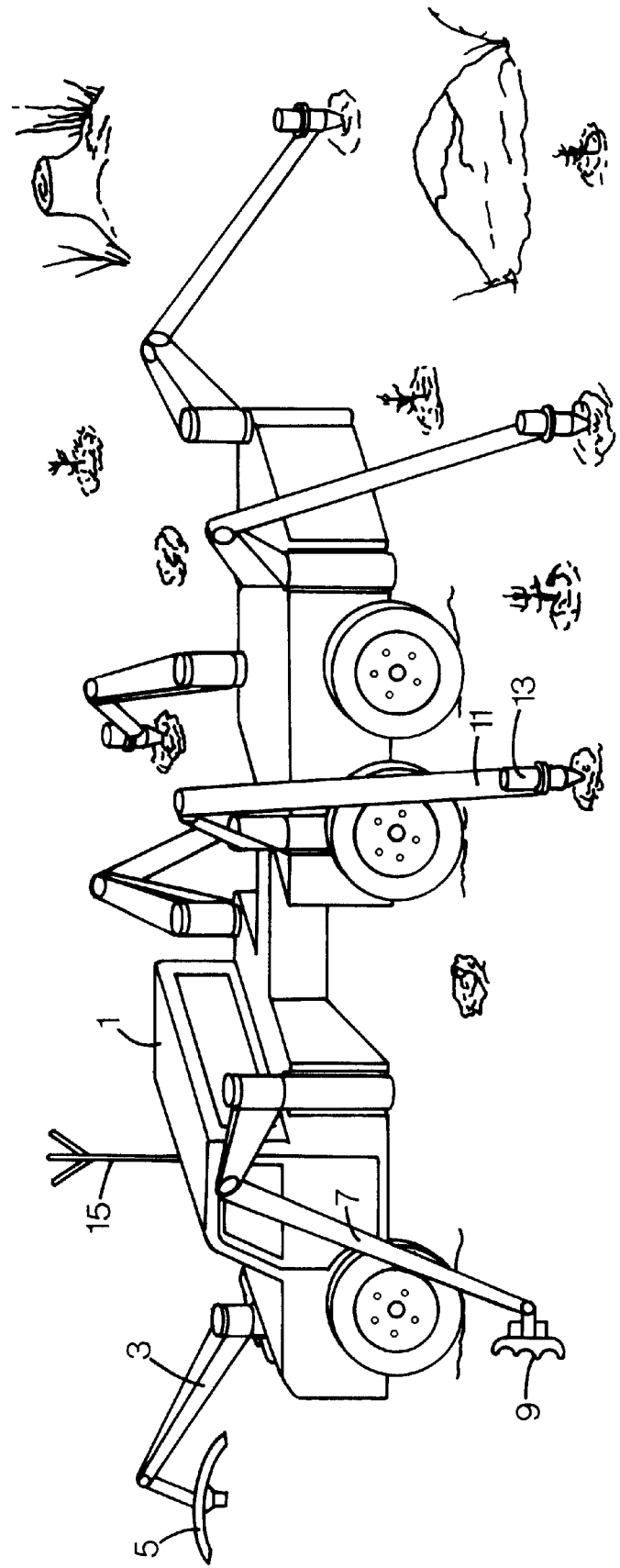
FIG. 1 shows a perspective view of a forest planting machine.

In FIG. 1 a planting machine is shown, the main part of which is a forest vehicle 1 and which possibly can be articulated. At the front most part at the front of the machine an arm 3 is provided, which is rotatable and hinged and the movements of which are controlled by means of hydraulic circuits. At the free end of the arm 3 a sensor is arranged for sensing conditions and surface of the soil, which in the illustrated embodiment is a screen of a georadar. This contains both a transmitter and a receiver for suitable radar wavelengths. Received echo signals are delivered to a control unit placed inside the machine for performing an evaluation. Furthermore, a sensor, not shown, is provided for determining the position and the angular position of the screen in relation to the vehicle 1. The signals from the position sensor are also supplied to the control unit.

Sensors of different kinds for determining soil characteristics can be used, which have in particular been developed for localizing land mines, see the article "Searching for land mines", Mechanical Engineering, April 1996, pp. 62–67. Here in addition to soil penetrating radar, georadar, IR-systems and acoustic systems can be mentioned.

At a position far at the front of the machine on each side, opposite each other, arms 7 are arranged which are rotatable and hinged and at their free end carry scarifying assemblies 9. Such an arm 7 can be designed so that the rotating wheel of the scarifying assembly 9 having cutting edges always has a substantially horizontal axis. Here also a sensor, not shown, is provided for determining the position of the assembly 9 in relation to the vehicle 1. The signals from the position sensor are in the same way as above supplied to the control unit.

On the rear part of the machine at each side two arms 11 are provided, which each is placed opposite a similar arm on the other side of the vehicle 1 and which each in the same way as the arms 7 is rotatable and hinged. These arms 11 carry at their free ends planting assemblies 13. The arms 11 can be designed so that the planting assemblies 13, always have a substantially vertical axis. In the same way as above sensors, not shown, are provided for determining the position of planting assemblies 13 in relation to the vehicle 1 and the signals from the position sensors are supplied to the control unit.

Furthermore, at 15 an antenna is illustrated which is mounted at the machine and is intended for wireless communication such as with GPS-satellites or with for example antennas located on the ground for an absolute determination of the position of the machine.

The function of the machine will now be described. The vehicle 1 is assumed to move continuously forwards at a low speed. The radar screen 5 is made to laterally scan over the ground area in front of the vehicle at the same time issuing radar waves of a suitable wavelength. The received echo signals are transmitted to the central control unit. At the same time the signals of the position sensor are provided to the control unit, which correlates measured echo signals with different points on the ground by evaluating both the signals from the position sensor and received position signals as to the absolute position of the vehicle. The echo signals are evaluated and in particular for each point of the scanned ground surface the depth of soil and the size of free area of the ground are determined in horizontal directions, i.e. in all different horizontal directions as viewed from each considered point. In particular different obstacles located in or above the soil layer can be determined as to their horizontal and vertical positions, their shape, etc. The determined data are stored and then evaluated for determining suitable planting locations. Then as input parameters the desired density of the planting is used, which for example can be indicated as the number of plants per hectare. Furthermore data in regard of already planted plants are used in the determination of suitable places. The determined new planting locations are stored.

At the same time the control unit controls the scarifying arms 7, so that the scarifying assemblies are placed over intended calculated planting places and there can turn up a piece of turf. Possibly, the scarifying assemblies 9 can also be provided with some device, not shown, for compacting the turned-up turf. The arms 7 are all the time controlled, so that they are rotated horizontally and are prolonged or shortened in a suitable way, so that their scarifying assemblies during a predetermined period stand still over the same intended planting location, though the vehicle 1 all the time is moving forwards. It is achieved by the control unit all the time receiving signals from the position sensors on the arms 7 and evaluating them together with the signals received through the antenna 15, which indicate the absolute geographic position of the vehicle 1.

In the same way the control unit at the same time also controls the planting arms 11, so that the planting assemblies 13 are placed over the prepared planting locations and there can plant the plant. The arms 11 are also here controlled all the time, so that they are rotated horizontally and are prolonged or shortened in a suitable way, whereby the planting assemblies during a sufficiently long time period can stand quite still over the intended planting place, when the vehicle 1 all the time slowly runs forwards.

Figure 2:
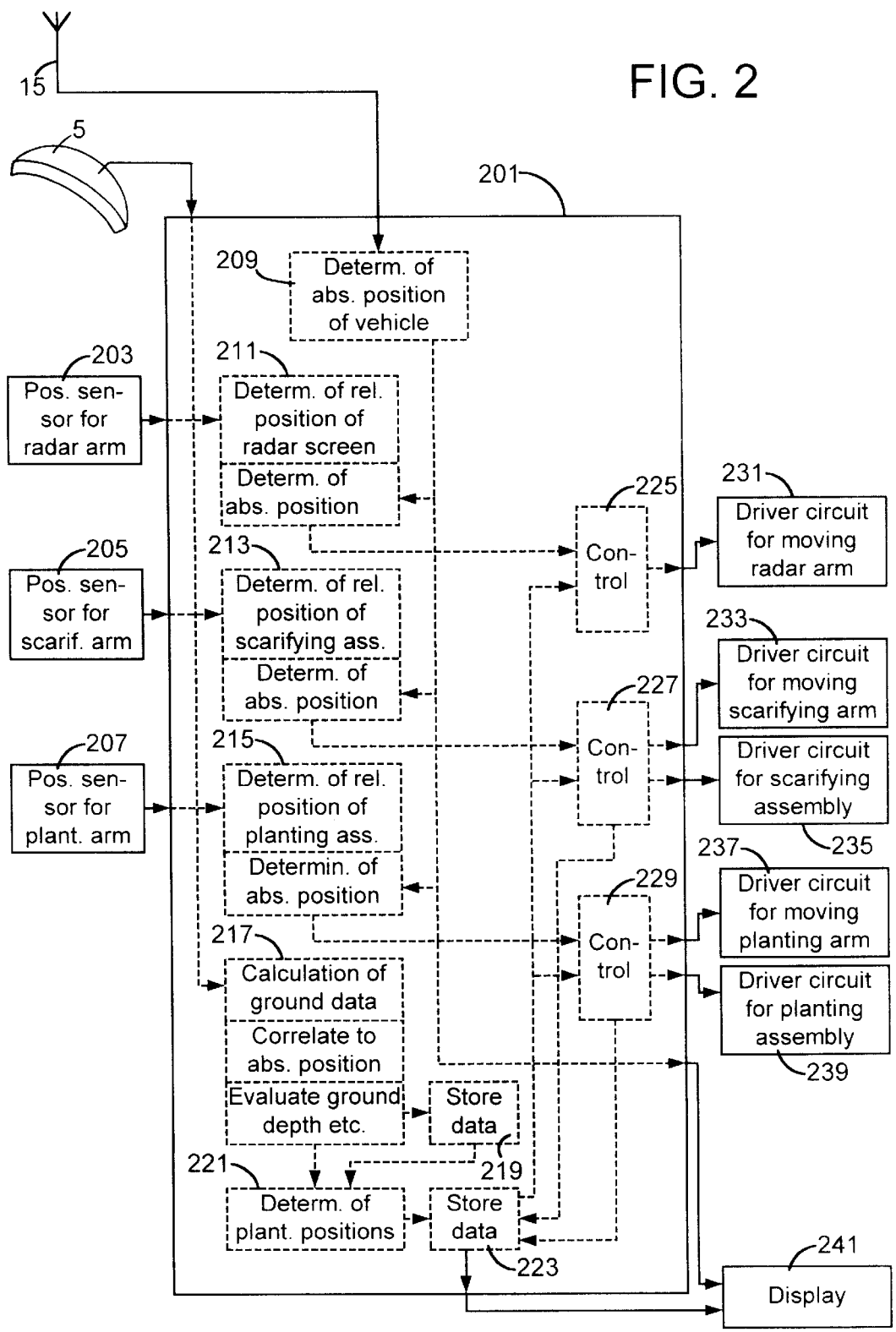
FIG. 2 shows a block diagram of electronic circuits included in the planting machine.

A block diagram of the electronic circuits of the planting machine is illustrated in FIG. 2. A central control unit 201 in the shape of a processor or a multitude of processors working in parallel receives signals from the antenna 15, from the radar screen 5 and from the position sensors 203, 205, 207 associated with the positions of the different arms 3, 7 and 11 respectively. The control unit 201 works according to a control rule, which can be divided in a number of processes or program routines working in parallel, which naturally can receive and transmit information to each other. A program routine 209 processes the GPS-signals and determines at each instant the exact absolute geographic position of the vehicle 1 and its absolute movement direction. Processes 211, 213 and 215 process the signals from the position sensors 203, 205 and 207 respectively and determines based thereon the instantaneously true values of the position of the respective assembly in relation to the vehicle 1, i.e. the position in the height direction and horizontally and the angular position of the radar screen 5, the positions of the scarifying assemblies 9 and the planting assemblies 13 in horizontal directions. Then the positions are absolutely determined by accessing information as to the absolute position of the vehicle from the module 209. A process 217 processes the signals from the georadar 5 for determining depth of soil, obstacles, etc. and correlates the calculated data with the correct absolute geographic position by receiving current position data from the module 209. The calculated data values are stored in a mass storage 219.

The stored data of the ground are then further evaluated in a module 221, which in an optimal way determines planting locations. For the determination the position determining module 221 also has access to the positions of already planted locations, which are stored in a memory 223. After having determined new planting locations, the positions thereof are stored in the memory 223.

Control processes 225, 227, 229 control the different movable parts of the planting machine, i.e. the movement of the radar arm 3, the movements of the scarifying arms 7 and energizing the assemblies 9 thereof and the movements of the planting arms 11 and energizing the planting assemblies 13. For this control they have access to the current position of their respective arm and for all arms except the radar arm 3 the determined positions of new planting places. The control modules 225, 227, 229 transmit signals to driver circuits for the different components. The control module 225 thus transmits signals to driver circuits 231 for operating the radar arm. The control module 227 transmits signals to driver circuits 233 for operating the scarifying arm and to driver circuits 235 for operating the scaryfying assembly. Further it is marked in the memory 223 after finishing a preparation of the respective place. The control module 229 transmits in the corresponding way signals to driver circuits 237 for operating the planting arm a nd to driver circuits 239 for operating the planting assembly. When a planting operation has been made, a signal is transmitted to the memory 223 to mark therein, that now a planting has been made on this place.

Figure 3:
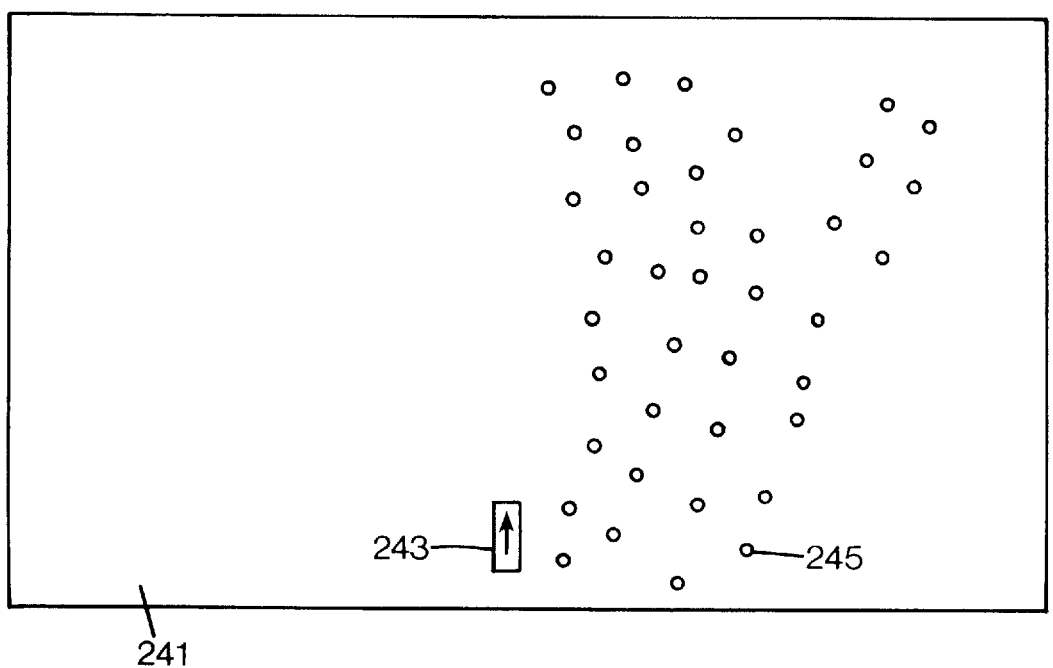
FIG. 3 shows a picture of a display mounted in the driver's cabin of the machine, which shows the position of the machine and planted locations and new selected planting locations.

Signals in regard of the current position of the vehicle and data referring to previously planted places and new selected planting places can be transmitted to a display 241, which can be mounted in the driver's cabin of the machine. On it can be displayed, see FIG. 3, the position of the vehicle centrally at the bottom, see the symbol 243, and symbols 245 of the planting places. When observing the display the driver of the vehicle can select such a road that the machine runs at a suitable distance from previously made plantings.

Various modifications of a planting machine as described above can be contemplated:

1. Scarifying soil before planting can be made in various ways. For removing other growing subjects the intended planting place can be heated or irradiated in some suitable way, for example by laser light or microwaves. Furthermore, the scarifying assembly can include a rotating drilling tool, in the case where planting is desired in frozen soil.
2. When making an evaluation for determining planting locations it can also, using a suitable algorithm, be made to select the most suitable kind of plant to be planted at an intended place. The evaluating algorithm has then access to data concerning the requirements on the considered kinds of plants, their location of growth, such as need for depth of soil, light conditions, kind of soil, altitude above sea level, etc. The machine must then carry plants of several kinds.

What is claimed is:

1. A method of planting plants into a soil using an automatic planting vehicle that is drivable on a ground area, comprising:

driving the planting vehicle on the ground area to move the planting vehicle;

while driving the planting vehicle, scanning the ground area with a scanning device attached to the planting vehicle for determining a depth of the soil and for determining a shape, size and position of obstacles on the ground area and in the soil to produce a scanning result;

evaluating the scanning result and identifying an obstacle;

determining a scanning position of the scanning device relative to the planting vehicle to an obstacle position of the obstacle identified;

moving a planting preparation device of an arm attached to the planting vehicle to the obstacle position;

while driving the planting vehicle, moving the arm relative to the driving planting vehicle so that the planting preparation device remains stationary at the obstacle position;

while driving the planting vehicle, moving a planting arm, attached to the planting vehicle, to a first planting position;

moving the planting arm relative to the driving planting vehicle so that the planting arm remains stationary at the first planting position and planting a first plant at the first planting position;

storing the first planting position;

while driving the planting vehicle, moving the planting arm to a second planting position; and moving the planting arm relative to the driving planting vehicle so that the planting arm remains stationary at the second planting position and planting a second plant at the second planting position, the second planting position being different than the first planting position.

2. The method according to claim 1 wherein the method further comprises using a remote sensor device that is mounted at a front of the planting vehicle and moving the planting vehicle in a forward direction.

3. The method according to claim 2 wherein the method further comprises using first planting position to determine a position of the second planting position.

4. An automatic planting vehicle for planting plants, comprising:

driving means for driving the automatic planting vehicle in a forward direction;

scanning means for scanning a ground area for determining a depth of a solid and detecting obstacles;

a preparation arm attached to the automatic planting vehicle, the preparation arm having a planting preparation device attached to an outer end of the preparation arm, the preparation arm and the planting preparation device being movable relative to the automatic planting vehicle;

a preparation arm sensor in operative engagement with the preparation arm to determine a preparation arm position relative to a position of the automatic planting vehicle;

a planting arm attached to the automatic planting vehicle, the planting arm being movable relative to the automatic planting machine, the planting arm having a planting device at an outer end of the planting arm;

a planting arm sensor in operative engagement with the planting arm to determine a planting arm position relative to the position of the automatic planting vehicle;

evaluation means connected to the scanning means for evaluating the depth of the soil, the detected obstacles and planting density to determine suitable planting positions;

storage means connected to the evaluation means for storing planting positions; and control means connected to the storage means for controlling a movement of the planting arm so that the planting arm is movable into a stationary position relative to the stored planting position during the movement of the automatic planting vehicle in the forward direction.

5. The automatic planting vehicle according to claim 4 wherein the scanning means has a remote sensing device that is mounted at a front portion of the automatic planting vehicle and the automatic planting vehicle has a planting assembly mounted at a rear portion of the automatic planting vehicle.

6. The automatic planting vehicle according to claim 5 wherein an intermediate portion of the automatic planting vehicle has a scarifying assembly attached thereto, the control means is also connected to the scarifying assembly to prepare planting positions.

* * * * *